United States Patent
Daniele et al.

(10) Patent No.: US 7,116,698 B2
(45) Date of Patent: Oct. 3, 2006

(54) GENERATOR OF REPETITIVE SETS OF SPREAD SPECTRUM SEQUENCES

(76) Inventors: Norbert Daniele, Mio Aplie Fanlin Labor, 38330 Montbonnot (FR); Dominique Noguet, 4 rue Claude Debussy, 38100 Grenoble (FR); Rosolino Lionti, 10, Impasse St. Ange, 38180 Seyssins (FR); Jean-René Lequepeys, 4 rue de la Republique, 38600 Fontaine (FR)

( * ) Notice: Subject to any disclaimer, the term of this patent is extended or adjusted under 35 U.S.C. 154(b) by 835 days.

(21) Appl. No.: 10/049,469

(22) PCT Filed: Jun. 13, 2001

(86) PCT No.: PCT/FR01/01828

§ 371 (c)(1),
(2), (4) Date: Feb. 12, 2002

(87) PCT Pub. No.: WO01/97398

PCT Pub. Date: Dec. 20, 2001

(65) Prior Publication Data

US 2002/0136265 A1    Sep. 26, 2002

(30) Foreign Application Priority Data

Jun. 14, 2000  (FR) .................................. 00 07561

(51) Int. Cl.
*H04B 1/69*  (2006.01)
(52) U.S. Cl. ..................... 375/130; 375/146; 375/367; 370/209; 370/515; 708/410
(58) Field of Classification Search ................ 375/130, 375/139, 142–143, 145, 149, 150, 152, 343, 375/367; 370/209, 515; 708/422, 426, 410
See application file for complete search history.

(56) References Cited

U.S. PATENT DOCUMENTS

| 5,790,591 A | 8/1998 | Gold et al. .................. 375/142 |
| 5,815,526 A | 9/1998 | Rice ........................... 375/146 |
| 6,452,959 B1 * | 9/2002 | McDonough ............... 375/130 |

FOREIGN PATENT DOCUMENTS

JP    0720327 A2 * 12/1995

* cited by examiner

*Primary Examiner*—Khai Tran
*Assistant Examiner*—Edith Chang
(74) *Attorney, Agent, or Firm*—Berkeley Law & Technology Group

(57) ABSTRACT

A generator of repetitive sets of spreading sequences comprising element (20), for counting and for forming an address and a table (30) containing L sets of S sequences, wherein the address contains $q=1+\log_2 S$ bits, in which one set among L ($L=2^q$) sets is selected and wherein the $\log_2 S$ bits select one sequence among the S sequences in the set.

1 Claim, 1 Drawing Sheet

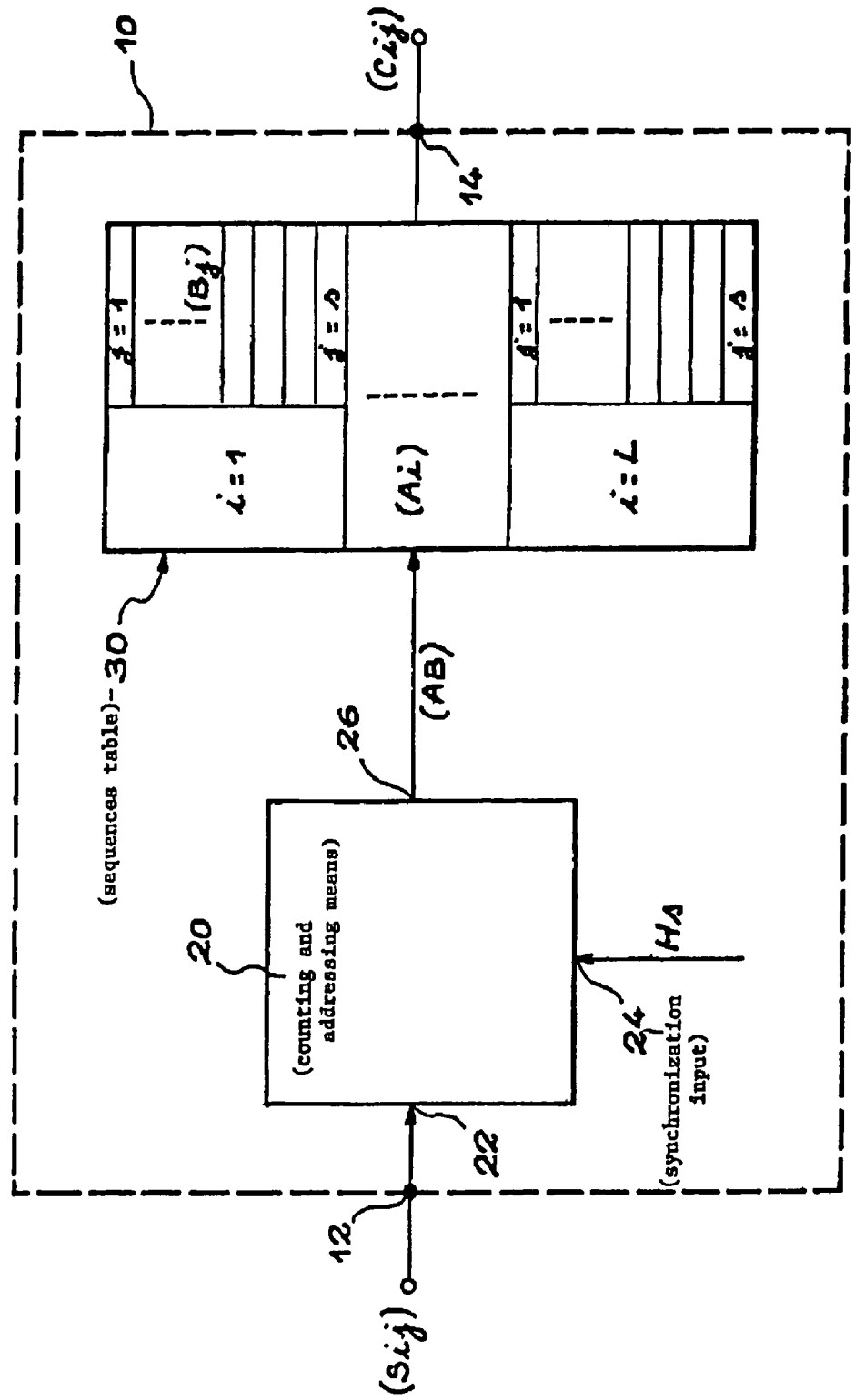

GENERATOR OF REPETITIVE SETS OF SPREAD SPECTRUM SEQUENCES

TECHNICAL DOMAIN

The purpose of this invention is a generator of repetitive sets of spreading sequences.

The invention is broadly applied for digital communications and more particularly for Wireless Local Area Networks (WLANs), Wireless subscriber Local Loops (WLL), mobile telephony, intelligent building management systems, remote charging, communication for transport, cable television, multimedia services on cable networks, etc.

STATE OF PRIOR ART

The spread spectrum technique is broadly known and has been described particularly in the following two books:

Andrew J. VITERBI: "CDMA—Principles of Spread Spectrum Communication" Addison-Wesley Wireless Communications Series, 1975, John G. PROAKIS: "Digital Communications" McGraw-Hill International Editions, 3rd edition, 1995.

One particular embodiment of this technique called orthogonal keying of order M, or "M-ary Orthogonal Keying" (MOK), one signal among a set of orthogonal signals is associated with each digital symbol to be transmitted. These signals may be spreading sequences in the same family of orthogonal sequences; in this case, the modulation also does the spreading. But these signals may also be not perfectly orthogonal.

If a symbol is composed of m bits, there are $2^m$ possible configurations for the different symbols. Therefore the number M of available sequences must be equal to at least $2^m$. If the length of these sequences is N, it is known that not more than N orthogonal sequences can be found. Therefore, we have M=N and the number of bits per symbol is limited to $\log_2 N$.

There is a variant to the MOK technique called "M-ary Bi-orthogonal Keying" (MBOK) that consists of adding opposite values to the set of orthogonal signals used in a MOK modulation, to form a set of 2M signals, which are obviously no longer all orthogonal to each other. Demodulation uses other M correlators adapted to each of the M orthogonal sequences but also necessitates means of retrieving the sign.

In French patent application No. 99 08308, Jun. 29 1999, the Applicant of this patent described and claimed a variant called multi-MOK or M-MOK for short. In this variant, the number of MOK modulation/demodulation operations is multiplied to deal with several data blocks. Naturally, this increases the number of sequences, but it also (very significantly) increases the information throughput.

Finally, in his application No. 99 09947, Jul. 30 1999, this Applicant described and claimed a process using repetitive sets of spreading sequences. In this technique, designed to reduce risks of interference between symbols, successive symbols are processed with different pseudo-random sequences, so that the received signals can be better discriminated on reception. The number of different successive sequences is limited to a fixed number S. After S sequences, previously used sequences are reused. In other words, packets of S symbols are processed by repetitive sets of S sequences. The result is that the time interval after which the same pseudo-random sequence is found again is S.Ts, if Ts is the duration of a symbol. In terms of throughput, this means that for given spreading, the allowable throughput is S times higher than in prior art.

PRESENTATION OF THE INVENTION

This process, that consists of processing packets of S symbols by repetitive sets of S pseudo-random sequences, can be improved by processing L packets of S symbols in parallel, with L sets of S different sequences giving a total of LS sequences.

In the last mentioned patent application, sets of sequences are obtained by reading a table (reference 50 in the application) containing LS pseudo-random sequences denoted Cij, and this is done by addressing this table with L addresses in parallel and the L required set of sequences are retrieved on L outputs in parallel. The remaining step is to spread the symbols Sij using the corresponding sequences Cij.

The purpose of this invention is to improve this generator of sets of spreading sequences.

According to the invention, the address formed is no longer composed only of q bits of symbols to be processed (as is the case in the MOK technique in which the q bits address one of the $2^q$ sequences), but it also includes additional bits corresponding to the S sequences. $\log_2 S$ additional bits are necessary to address S different sequences, and therefore the address must include a total of $q+\log_2 S$ bits.

More precisely, the purpose of this invention is a generator of repetitive sets of spreading sequences for the transmission of symbols by spread spectrum, characterized in that it comprises:

a) means of counting and forming an address comprising:
   an input, receiving the symbols to be processed;
   a synchronization input, receiving pulses synchronized with the symbols;
   means of counting the number of received symbols and forming an address, this address comprising a first part composed of a number q of bits where q is the number of bits in each symbol, and a second part composed of a number r of bits where $r=\log_2 S$, and where S denotes the number of sequences in a set of sequences, the address thus comprising a number p of bits where $p=q+\log_2 S$;
   an output on which this address can be collected, for each input of a symbol applied to the means.

b) a sequences table comprising a number L of blocks (where $L=2^q$), each block memorizing a set of S sequences, this table being addressed by the address output by the counting and addressing means, the first part of the address selecting one set among L and the second part selecting a sequence in this set.

BRIEF DESCRIPTION OF THE DRAWINGS

The single FIGURE is a diagrammatic view of the generator according to the invention.

DESCRIPTION OF A PARTICULAR EMBODIMENT

FIG. 1 shows a generator 10 according to the invention, with a main input 12 into which the numeric symbols Sij are input, and an output 14 through which the spreading sequences Cij are output. This generator 10 comprises essentially means 20 of counting and forming an address and a table 30 containing L sets of S sequences.

The means 20 comprise an input 22 receiving the symbols Sij to be processed, and a synchronization input 24 receiving the pulses Hs synchronized with the symbols.

The address formed by means 20 comprises a first part A composed of q bits, where q is the number of bits in each symbol, and a second part B composed of a number r of bits where $r=\log_2 S$, and S denotes the number of sequences in a set of codes. Thus the address AB comprises a number p of bits where $p=q+\log_2 S$. Therefore, this address has been extended and is longer than it was in prior techniques in which it only contained q bits.

The means 20 also comprise an output 26 containing the address to the table 30 that follows.

This table 30 comprises a number L of blocks Ai in which index i varies from 1 to $2^q$, each block memorizing a set of S sequences Bj where j varies from 1 to S. Therefore, the first part A of the address will select one block Ai among L, and the second part B will select one sequence Bj in this set. Finally, the address (AB) selects one sequence Cij among LS. These sequences are output through output 14.

For example, it would be possible to work starting from a single QPSK modulation (2 bits per symbol) on symbols with 4 bits per symbol (q=4) corresponding to 4 blocks Ai of 2 MOK bits, and using sets of S=4 sequences giving a total of 16 sequences which gives $r=\log_2 S=2$. The number of bits in the addresses will then be equal to 2+2=4.

In one modulation using the generator according to the invention, a set of repetitive codes is used and the sequencing of these codes is known on reception. Therefore, provided that synchronization is good, it is a priori possible to know the next code in each of the sets. Thus, the number of adapted filters necessary for the code skip part is no longer S, and is equal to 1 in the case of spread spectrum keying by direct sequence with single code skip, and $2^q$ in the case of a modulation with MOK type code skip, or $N.2^q$ in the case of a multi-code modulation with single code skip and MOK. Furthermore, it would be possible to use sliding correlators rather than adapted filters in order to simplify the embodiment. These sliding correlators can be controlled by an adapted filter that controls synchronization as described in document FR-A-2 779 590.

$S.2^q$ adapted filters are necessary to demodulate the data in reception in the case of the example of modulation with single code skip and MOK, without any reduction in complexity, while with the reduction in complexity resulting from this invention, $2^q$ sliding correlators and one adapted filter are sufficient.

The invention claimed is:

1. A generator of repetitive sets of spreading sequences for the transmission of symbols by spread spectrum, characterized in that it comprises:

a) means of counting and forming an address (20) comprising:

an input (22), receiving the symbols to be processed (Sij);

a synchronization input (24), receiving pulses (Hs) synchronized with the symbols;

means of counting the number of received symbols and forming an address (AB), the address comprising a first part (A) composed of a number q of bits, where q is the number of bits in each symbol, and a second part (B) composed of a number r of bits where $r=\log_2 S$, and where S denotes the number of sequences in a set of sequences, the address (AB) thus comprising a number p of bits where $p=q+\log_2 S$;

an output (23) on which the address (AB) can be collected, for each input of each symbol (sij) applied to the means as counting and forming the address (20);

b) a sequences table (30) comprising a number L of blocks (where $L=2^q$), each block memorizing the set of S sequences, the sequence table being addressed by the address output by the counting and addressing means, the first part (A) of the address selecting one set among the L blocks and the second part (B) selecting one sequence among the S sequences in the one set.

* * * * *